United States Patent
Castellino et al.

(10) Patent No.: US 9,895,677 B2
(45) Date of Patent: Feb. 20, 2018

(54) CATALYSED FILTER BASED ON BIOSOLUBLE FIBERS

(71) Applicant: Haldor Topsøe A/S, Kgs. Lyngby (DK)

(72) Inventors: Francesco Castellino, Birkerød (DK); Joakim Reimer Thøgersen, Kokkedal (DK); Peter Schoubye, Hørsholm (DK)

(73) Assignee: Haldor Topsoe A/S, Lyngby (DK)

( * ) Notice: Subject to any disclaimer, the term of this patent is extended or adjusted under 35 U.S.C. 154(b) by 530 days.

(21) Appl. No.: 14/208,014

(22) Filed: Mar. 13, 2014

(65) Prior Publication Data

US 2014/0271435 A1   Sep. 18, 2014

(30) Foreign Application Priority Data

Mar. 15, 2013   (DK) .................................. 2013 00149

(51) Int. Cl.

| | | |
|---|---|---|
| *B01J 23/22* | (2006.01) | |
| *B01D 53/56* | (2006.01) | |
| *B01D 53/62* | (2006.01) | |
| *B01J 21/06* | (2006.01) | |
| *B01J 35/04* | (2006.01) | |
| *B01D 53/86* | (2006.01) | |
| *B01J 21/16* | (2006.01) | |

(52) U.S. Cl.
CPC ............ *B01J 23/22* (2013.01); *B01D 53/565* (2013.01); *B01D 53/62* (2013.01); *B01D 53/864* (2013.01); *B01D 53/865* (2013.01); *B01J 21/063* (2013.01); *B01J 21/16* (2013.01); *B01J 35/04* (2013.01); *B01D 2255/20707* (2013.01); *B01D 2255/20723* (2013.01); *B01D 2255/915* (2013.01)

(58) Field of Classification Search
CPC .... B01D 53/62; B01D 53/565; B01D 53/864; B01D 53/865; B01D 53/56; B01D 2255/20707; B01D 2255/20723; B01D 2255/915; B01J 23/00; B01J 23/22; B01J 21/063; B01J 21/16; B01J 35/04
See application file for complete search history.

(56) References Cited

U.S. PATENT DOCUMENTS

| | | | |
|---|---|---|---|
| 6,106,797 A | 8/2000 | Müller et al. | |
| 7,993,617 B2* | 8/2011 | Rasmussen | ........ B01D 53/8628 423/239.1 |
| 2007/0264181 A1 | 11/2007 | Heidenreich et al. | |
| 2010/0075845 A1* | 3/2010 | Liu | ................... B01D 39/2086 502/407 |

FOREIGN PATENT DOCUMENTS

| | | |
|---|---|---|
| EP | 0 336 882 A1 | 10/1989 |
| EP | 1 985 352 A2 | 10/2008 |
| EP | 2 044 997 A1 | 4/2009 |
| EP | 2 158 956 A1 | 3/2010 |
| WO | WO 2008/144291 A2 | 11/2008 |

OTHER PUBLICATIONS

CN102764643, see machine translation.*

* cited by examiner

*Primary Examiner* — Melvin C. Mayes
*Assistant Examiner* — Smita S Patel
(74) *Attorney, Agent, or Firm* — Blank Rome LLP

(57) ABSTRACT

Catalyzed filter consisting of a filter body of bio-soluble fibers catalyzed with a catalyst comprising oxides of vanadium and titanium, wherein the total concentration of alkali metals in the filter body is less than 3000 ppm by weight and/or the total concentration of alkali earth metals in the filter body is less than 20% by weight.

6 Claims, No Drawings

CATALYSED FILTER BASED ON BIOSOLUBLE FIBERS

BACKGROUND OF THE INVENTION

1. Field of the Invention

The present invention is directed to catalysed filters made of bio-soluble fibers.

2. Description of the Related Art

A combination of a dust filter and a catalyst is highly desired in the industry where both particle removal and gaseous emission control are required in order to meet the local regulations.

Examples are combustion processes for the power production where both fly ash, nitrogen oxides (NOx) and CO may have to be removed. For instance, removal of NOx can be effectively achieved by the SCR process which involves injection of NH3 and reaction of NOX on a V-based catalyst.

Combining a dust filter and a catalyst gives the possibility to have two or more processes combined in one physical installation. The footprint of the required after-treatment installation is then decrease drastically. Furthermore, the operation of the plant requires fewer operators.

The combination of catalysts and filters is, however, not as straightforward. Catalysts may importantly differ in chemical composition depending on the particular application. Both the support and the active phase may be constituted by several chemical elements. Filters may also be constituted by different chemical compounds, which in many cases may interfere with the catalyst activity. In some cases, the interaction between the filter constituents and the catalyst may cause poisoning of the catalyst and subsequently poor performance of the catalytic filter.

In the case of high temperature ceramic filters, for instance, several types of fibers may be used for their production. These can be constituted e.g. by silica-aluminate, calcium-magnesium-silicates, calcium-silicates fibers, or a mixture of them, all containing alkali and/or alkali-earth metals in different quantities as constituents.

Another way of distinguishing between the different ceramic filters is by classifying their fibers as bio-soluble or not. Bio-soluble fibers are preferred since they have a high solubility in physiological media and do not pose risks to the health of humans. Non bio-soluble fibers are instead being classified as carcinogenic. Silica-alumina fibers are an example of non-bio-soluble fibers.

Today, the only ceramic catalytic filters available on the market are based on non-bio-soluble silica-aluminate fibers and V/Ti catalyst for the simultaneous removal of dust, NOx and dioxins. In particular, the combination of the silica-aluminate fibers and the V/Ti catalyst ensures no poisoning of the catalyst. These fibers are chemically very stable and no poisons are released during operation, which, in the case of the SCR reaction is in the range 180-370° C. Despite their stability and high efficiency, there is the wish of using ceramic catalytic filters for the removal of NOx based on the same V/Ti catalyst but on bio-soluble fibers. We have attempted developing such a filter and observed that most of the bio-soluble fibers tend to deactivate the V/Ti catalyst. The reason for the deactivation has been found in the alkali-content found in the bio-soluble fibers. Alkali metals (i.e. K and Na) are in fact very strong poisons for the V-based SCR catalyst. In most of the tested fibers, the alkali fraction is not strongly bound to the fiber constituent, so that, during operation some alkali metals are released and get into chemical contact with the catalyst particles.

DETAILED DESCRIPTION OF THE INVENTION

Pursuant to the above findings and observations, the invention provides a catalysed filter consisting of a filter body of bio-soluble fibres catalysed with a catalyst comprising oxides of vanadium and titanium, wherein the total concentration of alkali metals in the filter body is less than 0.1% by weight and/or the total concentration of alkali earth metals in the filter body is less than 10% by weight.

Suitable bio-soluble fibers for use in the catalysed filter according the invention are selected from the group of calcium-magnesium-silicates.

In a further embodiment of the invention, the catalysed filter is used for the removal of particulate matter and at least one of nitrogen oxides, dioxins and carbon monoxide from gases.

Temperature is believed to be a parameter influencing the release rate of the poison and consequently the deactivation rate of the catalytic filters.

Thus, according to a further embodiment of the invention, the temperature of the gasses to be treated with the filter is less than 450° C.

The table below reports chemical analysis of the bio-soluble ceramic filters used in the tests. All filters were impregnated with slurry containing the V/Ti catalyst active in the SCR reaction.

Among the three different filters, only the one made of Fiber 1 reported good and stable SCR activity. The filters made of Fiber 2 and 3 reported deactivation during operation. The rate of deactivation was highly increased by operating the filters at temperatures >250 deg C.

|  | K | Na | Mg | Ca |
| --- | --- | --- | --- | --- |
| Fiber 1 | 0.02 wt % | 0.02 wt % | 0.7 wt % | 8 wt % |
| Fiber 2 | 0.16 wt % | 0.45 wt % | 0.94 wt % | 23.5 wt % |
| Fiber 3 | <200 wt ppm | 0.354 wt % | <130 wt ppm | 410 wt ppm |

From the figures reported in the table above, it can be concluded that in order to manufacture a catalytic filter based on V/Ti catalyst and bio-soluble ceramic filters it is necessary to keep the total alkali concentration (i.e. K+Na) in the fibers <3000 wt ppm. Moreover, the total concentration of alkali earth metals is preferred to be <20 wt %.

Fiber 2 and 3 did not meet the former requirement and are therefore believed to not be suitable for the production of catalytic ceramic filters for the removal of NOx and dioxins on V-based catalysts.

What is claimed is:

1. Catalysed filter consisting of a filter body of bio-soluble fibers catalysed with a catalyst comprising oxides of vanadium and titanium, wherein total concentration of alkali metals is greater than zero, but less than 0.1% by weight and the total concentration of alkali earth metals in the filter body is greater than zero, but less than 10% by weight.

2. The catalysed filter of claim 1, wherein the bio-soluble fibers are selected from the group of calcium-magnesium-silicates.

3. A method of removal of particulate matter and nitrogen oxides, dioxins and carbon monoxide from gases comprising the step of utilizing the catalysed filter of claim 1 for the removal of particulate matter and at least one of nitrogen oxides, dioxins and carbon monoxide from gases.

4. A method of removal of particulate matter, dioxins and carbon monoxide from gases comprising the step of utilizing the catalysed filter of claim 2 for the removal of particulate matter and at least one of nitrogen oxides, dioxins and carbon monoxide from gases.

5. The method of claim 3, wherein the temperature of the gasses is less than 450° C.

6. The method of claim 4, wherein the temperature of the gasses is less than 450° C.

* * * * *